US012577918B2

(12) United States Patent
Tranel et al.

(10) Patent No.: US 12,577,918 B2
(45) Date of Patent: Mar. 17, 2026

(54) ASYMMETRIC FUEL INJECTION WINDOW AND FUEL METERING WINDOW

(71) Applicant: Caterpillar Inc., Peoria, IL (US)

(72) Inventors: Brian V. Tranel, Dunlap, IL (US); Andrew O. Marrack, Peoria Heights, IL (US); Gregory L. Armstrong, Edwards, IL (US); Dustin K. Fee, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 18/778,438

(22) Filed: Jul. 19, 2024

(65) Prior Publication Data

US 2026/0022673 A1 Jan. 22, 2026

(51) Int. Cl.
*F02D 41/00* (2006.01)
*F02D 41/30* (2006.01)

(52) U.S. Cl.
CPC ......... *F02D 41/0025* (2013.01); *F02D 41/30* (2013.01)

(58) Field of Classification Search
CPC ............................. F02D 41/0025; F02D 41/30
See application file for complete search history.

(56) References Cited

U.S. PATENT DOCUMENTS 5,163,397 A * 11/1992 Pien ...................... F02M 43/02 123/304
5,996,338 A 12/1999 Hirota
6,874,490 B2 4/2005 Surnilla
7,021,276 B2 4/2006 Liu et al.
7,556,017 B2 * 7/2009 Gibson ............... F02M 47/027 123/305
10,066,565 B2 9/2018 Barth et al.
11,015,539 B2 5/2021 Fulton et al.
11,384,699 B2 7/2022 Sixel et al.
12,297,795 B1 5/2025 Schroeder et al.
(Continued)

FOREIGN PATENT DOCUMENTS

DE 102012208781 A1 11/2013
DE 102023132299 A1 6/2024
WO 2016001654 A2 4/2016

OTHER PUBLICATIONS

Written Opinion and International Search Report for Int'l. Patent Appln. No. PCT/US2025/034310, mailed Oct. 15, 2025 (12 pgs).

*Primary Examiner* — Grant Moubry
*Assistant Examiner* — Ruben Picon-Feliciano

(57) ABSTRACT

A multi-fuel injection system and method for controlling a fuel injector to perform fuel injection using a fuel injection window and to perform fuel metering using a fuel metering window that is asymmetric to the fuel injection window are provided. The multi-fuel injection system may receive a first fuel and receive a second fuel. The multi-fuel injection system may control a fuel injector to perform fuel injection, of at least one of the first fuel or the second fuel into a cylinder of an engine, during a fuel injection window. The multi-fuel injection system may control the fuel injector to perform fuel metering, of the second fuel into a nozzle of the fuel injector while the fuel injector is not injecting either of the first fuel or the second fuel into the cylinder of the engine, during a fuel metering window that is asymmetric to the fuel injection window.

19 Claims, 6 Drawing Sheets

(56) References Cited

U.S. PATENT DOCUMENTS

| | | | | |
|---|---|---|---|---|
| 2013/0098333 | A1* | 4/2013 | Kim | F02D 19/0694<br>123/445 |
| 2014/0158071 | A1* | 6/2014 | Svensson | F02B 75/021<br>123/64 |
| 2014/0316677 | A1* | 10/2014 | Stockner | F02M 43/00<br>701/103 |
| 2016/0169132 | A1* | 6/2016 | Yeager | F02D 41/0025<br>701/103 |
| 2017/0016416 | A1* | 1/2017 | Shafer | F02M 63/0225 |
| 2020/0063701 | A1* | 2/2020 | Anders | F02B 23/0669 |
| 2021/0277856 | A1* | 9/2021 | Mahmood | F02M 51/061 |
| 2023/0184189 | A1 | 6/2023 | Marrack et al. | |

* cited by examiner

ASYMMETRIC FUEL INJECTION WINDOW AND FUEL METERING WINDOW

TECHNICAL FIELD

The present disclosure relates generally to fuel injectors, and, more particularly, to a system and method for controlling a fuel injector to perform fuel injection using a fuel injection window and to perform fuel metering using a fuel metering window that is asymmetric to the fuel injection window.

BACKGROUND

A fuel injector may include various valves and fuel flow paths. The configurations and sizes of the various fuel flow paths affect the amount of fuel that flows through the fuel injector. Further, pressure from fuel or external sources affects the amount of fuel that flows through the fuel injector.

Some fuel injectors are configured for injecting two different fuels. These types of fuel injectors are relatively complex due to the separate fuel paths. Additionally, fuel injectors capable of injecting two fuels include components that control the quantity of each injected fuel. Some fuel injectors exhibit inconsistent injection quantity of one, or both of, the fuels due to the fuel flow paths, fluctuations in fuel pressure, limited clearances, or other aspects of the injector and fuel supply system.

U.S. Pat. No. 5,996,338, issued on Dec. 7, 1999, ("the '338 patent"), describes a system that performs two fuel injections in one cycle. The first fuel injection is the normal fuel injection conducted around the top dead center of the compression stroke, and the second fuel injection is a secondary fuel injection conducted at the expansion stroke or exhaust stroke of the engine to supply a reducing agent to exhaust gas. The '338 patent does not disclose a system and method for controlling a fuel injector to perform fuel injection using a fuel injection window and to perform fuel metering using a fuel metering window that is asymmetric to the fuel injection window.

The aspects of the present disclosure may solve one or more of the problems set forth above and/or other problems in the art. The scope of the current disclosure, however, is defined by the attached claims, and not by the ability to solve any specific problem.

SUMMARY

In one aspect, a method includes receiving, by a multi-fuel injection system, a first fuel; receiving, by the multi-fuel injection system, a second fuel; controlling, by the multi-fuel injection system, a fuel injector to perform fuel injection, of at least one of the first fuel or the second fuel into a cylinder of an engine, during a fuel injection window; and controlling, by the multi-fuel injection system, the fuel injector to perform fuel metering, of the second fuel into a nozzle of the fuel injector while the fuel injector is not injecting either of the first fuel or the second fuel into the cylinder of the engine, during a fuel metering window that is asymmetric to the fuel injection window.

In one aspect, an electronic control module (ECM) includes a memory configured to store instructions; and one or more processors configured to execute the instructions to: control a fuel injector to perform fuel injection, of at least one of first fuel or a second fuel into a cylinder of an engine, during a fuel injection window; and control the fuel injector to perform fuel metering, of the second fuel into a nozzle of the fuel injector while the fuel injector is not injecting either of the first fuel or the second fuel into the cylinder of the engine, during a fuel metering window that is greater than the fuel injection window.

In one aspect, a system may include a fuel injector configured to perform fuel injection and fuel metering; and an electronic control module (ECM) configured to: control the fuel injector to perform the fuel injection, of at least one of a first fuel or a second fuel into a cylinder of an engine, during a fuel injection window; and control the fuel injector to perform the fuel metering, of the second fuel into a nozzle of the fuel injector while the fuel injector is not injecting either of the first fuel or the second fuel into the cylinder of the engine, during a fuel metering window that is asymmetric to the fuel injection window.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value.

Figure 1:
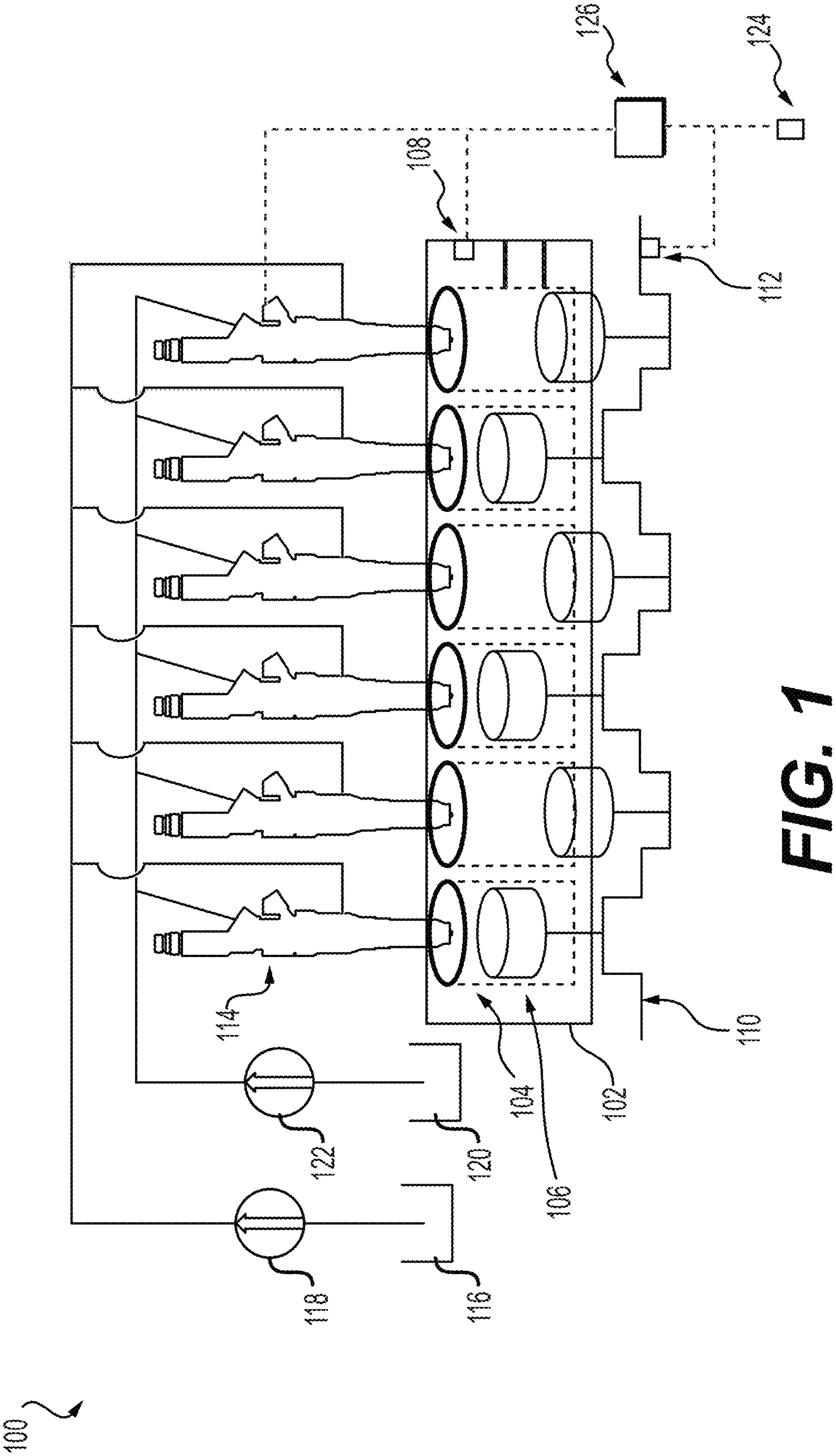
FIG. 1 is a diagram of an example multi-fuel injection system.

FIG. 1 is a diagram of an example multi-fuel injection system 100. As shown in FIG. 1, the multi-fuel injection system 100 may include an engine 102, cylinders 104, pistons 106, an engine sensor 108, a crankshaft 110, a crankshaft sensor 112, fuel injectors 114, a primary fuel reservoir 116, a primary fuel pump 118, a pilot fuel reservoir 120, a pilot fuel pump 122, a sensor 124, and an ECM 126.

According to an embodiment, the multi-fuel injection system 100 may be provided in heavy equipment or other types of mobile or stationary industrial machines. For example, heavy equipment may include an articulated truck, an asphalt paver, a backhoe loader, a cold planer, a compactor, a dozer, a dragline, a drill, an excavator, a mining shovel, a material handler, a motor grader, a wheel loader, or the like. Other types of suitable industrial machines include stationary or mobile power generation machines, among others. According to an embodiment, the multi-fuel injection system 100 may be provided in a marine power system. For example, a marine power system may include a propulsion engine, a marine generator, an auxiliary engine, or the like. In other examples, the multi-fuel injection system 100 may be provided in an oil and gas system. The oil and gas system may include a power grid stabilization system, a gas compression engine, a land drilling engine, a land drilling generator, a land production generator, an offshore drilling and production generator, a well service engine, or the like. Alternatively, the multi-fuel injection system 100 may be provided in an industrial power system. For example, the industrial power system may include an industrial diesel engine, an industrial diesel power unit, a diesel fire pump, or the like.

The engine 102 may include one or more cylinders 104. The engine 102 may include an engine sensor 108 that is configured to output engine sensor data. The engine sensor data may include a heat value of the engine 102, a heat value of a cylinder 104, a pressure value of a cylinder 104, a speed of the engine 102, or the like. Each cylinder 104 may include a piston 106 that is connected to a crankshaft 110. The piston 106 may travel between top dead center and bottom dead center to rotate the crankshaft 110. The crankshaft sensor 112 is configured to output crankshaft sensor data. The crankshaft sensor data may indicate a rotation angle of the crankshaft 110 (e.g., a rotational position of the crankshaft 110), a rotational speed of the crankshaft 110, or the like. Each cylinder 104 may include a corresponding fuel injector 114 that is configured to inject fuel into the cylinder 104.

The primary fuel reservoir 116 may store a primary fuel. The primary fuel pump 118 may pump the primary fuel from the primary fuel reservoir 116 to respective fuel injectors 114. The pilot fuel reservoir 120 may store a pilot fuel. The pilot fuel pump 122 may pump the pilot fuel to respective fuel injectors 114. The fuel injector 114 may be configured to inject the primary fuel and the pilot fuel into the cylinder 104. According to an embodiment, the primary fuel may be methanol, and the pilot fuel may be diesel. Alternatively, the primary fuel may be ethanol (e.g., E85), biodiesel, biogas, hydrogenated vegetable oil, or the like, and the pilot fuel may be dimethyl ether, Fischer-Tropsch fuel, or the like. For a single combustion cycle, the fuel injector 114 may inject a total amount of fuel into the cylinder 104. The total amount of fuel may include an amount of the primary fuel and an amount of the pilot fuel. A percentage of the amount of the primary fuel to the total amount of fuel may be greater than or equal to a threshold (e.g., 50% by volume, 60% by volume, or the like). Further, a percentage of the pilot fuel to the total amount of fuel may be less than or equal to the threshold. For each combustion cycle, the fuel injector 114 may inject the pilot fuel entirely before the primary fuel, may inject the pilot fuel substantially before the primary fuel, or the like.

The sensor 124 may be configured to output sensor data to the ECM 126. For example, the sensor data may indicate a gas pedal position, a brake pedal position, a lever position, a geographical position, a temperature, a pressure, a speed, an acceleration, a maintenance status, a fuel amount, or the like.

The ECM 126 may be configured to generate a combustion signal having a combustion waveform. The combustion signal may cause fuel injection by the fuel injector 114. The ECM 126 may control the fuel injector 114 to perform fuel injection during a fuel injection window. The fuel injection window may be a period of time during which the ECM 126 is permitted to supply electrical energy to the spill valve solenoid 210 and the control valve solenoid 218 in a manner that causes fuel injection. Additionally, or alternatively, the fuel injection window may be a range of crank angles in which the ECM 126 is permitted to supply electrical energy to the spill valve solenoid 210 and the control valve solenoid 218 in a manner that causes fuel injection. The supply of electrical energy to the spill valve solenoid 210 and the control valve solenoid 218 may be impermissible outside of the fuel injection window.

The ECM 126 may be configured to generate a metering signal having a metering waveform. The metering signal may cause fuel metering of the fuel injector 114. The ECM 126 may control the fuel injector 114 to perform fuel metering during a fuel metering window. The fuel metering window may be a period of time during which the ECM 126 is permitted to supply electrical energy to the control valve solenoid 218 in a manner that causes fuel metering. Additionally, or alternatively, the fuel metering window may be a range of crank angles in which the ECM 126 is permitted to supply electrical energy to the control valve solenoid 218 in a manner that causes fuel metering. The supply of electrical energy to the control valve solenoid 218 may be impermissible outside of the fuel metering window.

Although FIG. 1 depicts particular components, a particular arrangement of the components, and a particular number of the components, it should be understood that other embodiments may include different components, differently arranged components, and/or a different number of components.

Figure 2:
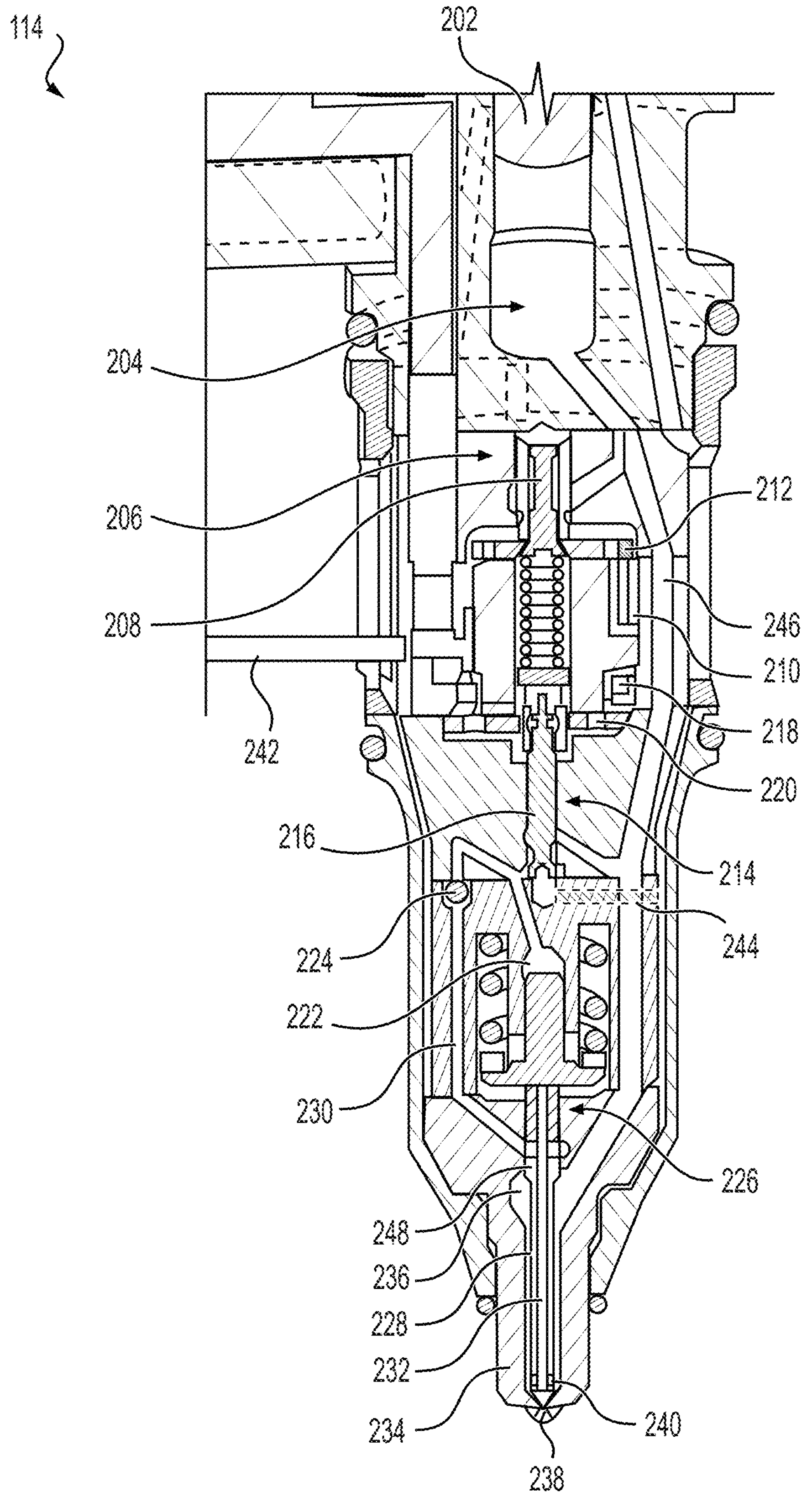
FIG. 2 is a diagram of an example fuel injector.

FIG. 2 is a cross-sectional diagram of an example fuel injector 114. As shown in FIG. 2, the fuel injector 114 may include a plunger 202, a chamber 204, a spill valve 206, a spill valve member 208, a spill valve solenoid 210, a spill valve armature 212, a control valve 214, a control valve member 216, a control valve solenoid 218, a control valve armature 220, a control chamber 222, a one-way valve 224, an injection valve 226, an injection valve member 228, an injection valve fill passage 230, an injection valve passage 232, a nozzle 234, a nozzle chamber 236, an orifice 238, a pilot fuel opening 240, a pilot fuel supply connection 242, a low-pressure fuel passage 244, a pressurized fuel passage 246, and a radial fuel passage 248.

The spill valve 206 may include the spill valve member 208 that is movable between an open position and a closed position. The spill valve solenoid 210 may actuate the spill valve member 208 between the open position and the closed position via the spill valve armature 212. In the open position, the spill valve member 208 may enable primary fuel within the pressurized fuel passage 246 to drain. In the closed position, the spill valve member 208 may prevent draining of the primary fuel, which permits pressurization of the primary fuel via movement of the plunger 202 within the chamber 204.

The control valve 214 may include the control valve member 216 that is movable between a non-injection position and an injection position. The control valve solenoid 218 may actuate the control valve member 216 between the non-injection position and the injection position via the control valve armature 220. In the non-injection position, the control valve member 216 may block a connection between the low-pressure fuel passage 244 and the control chamber 222. In the injection position, the control valve member 216 may fluidly connect the low-pressure fuel passage 244 and the control chamber 222. The control valve 214 may further be configured to control the introduction of pilot fuel into the injection valve 226. In the injection position, the control valve member 216 may permit the control chamber 222 to provide pilot fuel to the injection valve 226.

The control valve 214 may include the control valve member 216 that is movable between a metering position and a non-metering position, which may correspond to the injection position and the non-injection position, respectively. The control valve solenoid 218 may actuate the control valve member 216 between the metering positon and the non-metering position via the control valve armature 220. The control valve 214 may be configured to perform fuel metering by supplying the pilot fuel into the nozzle 234 when the fuel injector 114 is not performing fuel injection. The control valve 214 may be actuated for a period of time prior to fuel injection to cause the pilot fuel to flow from the pilot fuel supply connection 242 to the low-pressure fuel passage 244. The control valve member 216 may permit the pilot fuel to pass the one-way valve 224 and enter into the injection valve fill passage 230, the radial fuel passage 248, the injection valve member 228, and the pilot fuel opening 240.

The injection valve 226 may include the injection valve member 228 that is movable between a non-injection position and an injection position. In the non-injection position, the injection valve member 228 may block the orifice 238 of the nozzle 234. In the injection position, the injection valve member 228 may un-block the orifice 238 to allow fuel injection of the primary fuel and/or the pilot fuel from the nozzle chamber 236.

The injection valve member 228 may have a needle-like shape that extends from a proximal end abutting the control chamber 222 to a distal end that blocks and unblocks the orifice 238. The injection valve member 228 may have a hollow interior that defines the injection valve passage 232. The injection valve passage 232 may be configured to guide pilot fuel to the distal end of the nozzle chamber 236 of the nozzle 234 and, if desired, store a quantity of the pilot fuel in the hollow interior. The hollow interior may extend from a central portion of the injection valve member 228 that abuts the injection valve fill passage 230 to the distal end of the injection valve member 228 within the nozzle chamber 236. The proximal portion of the injection valve passage 232 may include the radial fuel passage 248 in a central portion of the injection valve passage 232 that is in fluid communication with the injection valve fill passage 230. The injection valve passage 232 may include the pilot fuel opening at, or near, the distal end of the injection valve 226. The pilot fuel opening may open into the nozzle chamber 236 within the nozzle 234. The injection valve fill passage 230 may include the one-way valve 224 that allows flow of fuel from the control chamber 222 to the radial fuel passage 248, and prevents the fuel from returning to the control chamber 222 via the injection valve fill passage 230.

The fuel injector 114 may receive the primary fuel from the primary fuel reservoir 116. The fuel injector may 114 include a primary fuel path including the chamber 204, the pressurized fuel passage 246, the nozzle chamber 236, and the nozzle 234. The primary fuel path may also include the spill valve 206. The spill valve 206 may be configured to pressurize the primary fuel within the fuel injector 114, and drain the primary fuel from the fuel injector 114.

The fuel injector 114 may receive the pilot fuel from the pilot fuel reservoir 120. The fuel injector 114 may include a pilot fuel path. The pilot fuel path may include the pilot fuel supply connection 242, the low-pressure fuel passage 244, the injection valve fill passage 230, the control chamber 222, the injection valve passage 232 formed within a hollow interior of the injection valve 226 that includes the radial fuel passage 248, the pilot fuel opening 240, and the nozzle 234.

Figure 3:
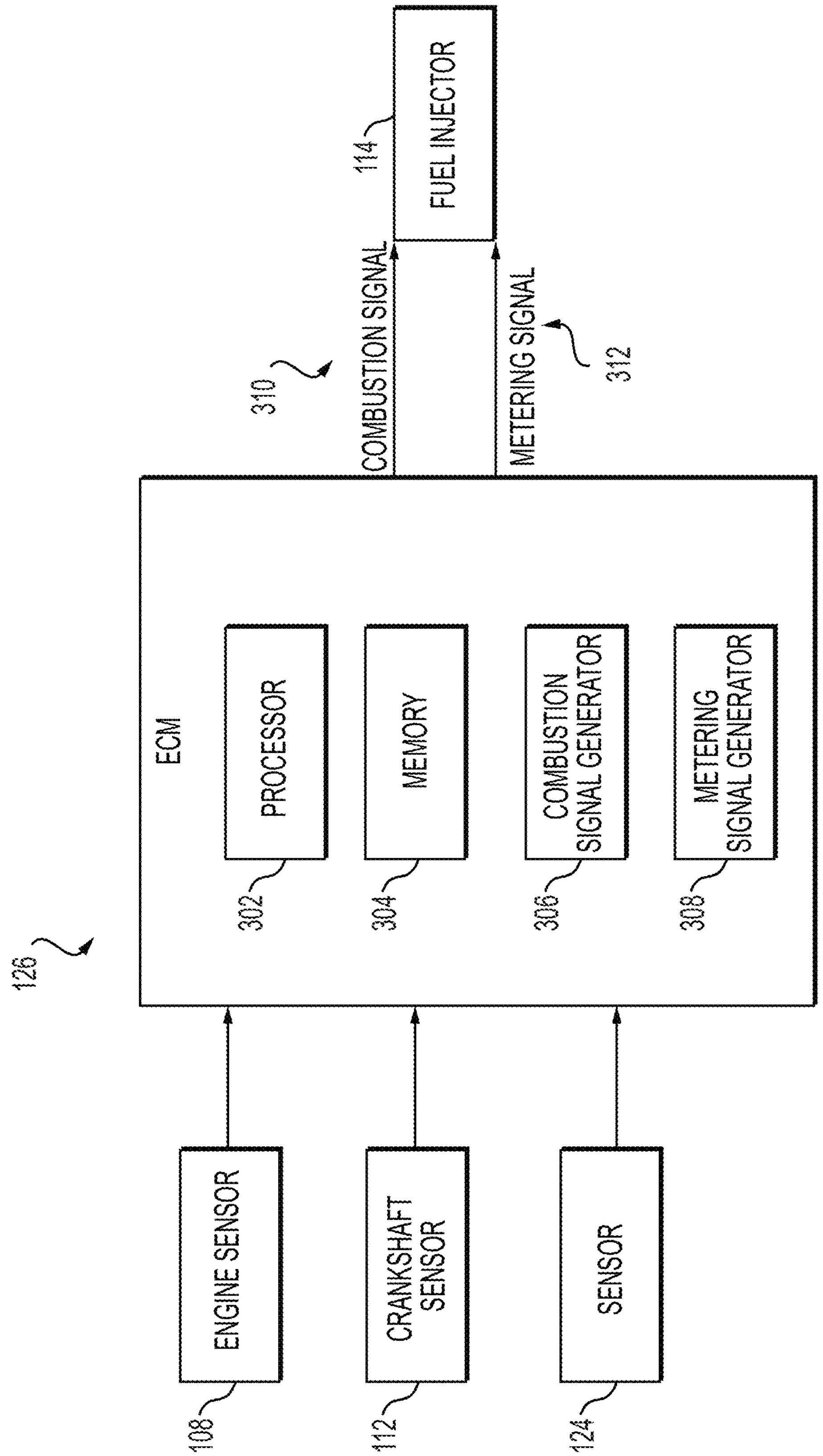
FIG. 3 is a diagram of an electronic control module (ECM).

FIG. 3 is a diagram of an example ECM 126. As shown in FIG. 3, the ECM 126 may include a processor 302, a memory 304, a combustion signal generator 306, and a metering signal generator 308.

The processor 302 may be a central processing unit (CPU), a graphics processing unit (GPU), an accelerated processing unit (APU), a microprocessor, a controller, a microcontroller, a digital signal processor (DSP), a field-programmable gate array (FPGA), an application-specific integrated circuit (ASIC), or the like. The processor 302 may be implemented in hardware, firmware, or a combination of hardware and software. The processor 302 may include one or more processors 302 configured to perform the operations described herein. For example, a single processor 302 may be configured to perform all of the operations described herein. Alternatively, multiple processors 302, collectively, may be configured to perform all of the operations described herein, and each of the multiple processors 302 may be configured to perform a subset of the operations described herein. For example, a first processor 302 may perform a first subset of the operations described herein, a second processor 302 may be configured to perform a second subset of the operations described herein, etc.

The memory 304 may be configured to store information and/or instructions for use by the processor 302. The memory 304 may be a non-transitory computer-readable medium. For example, the memory 304 may be a random access memory (RAM), a read only memory (ROM), a flash memory, a magnetic memory, an optical memory, or the like. The memory 304 may be configured to store instructions that, when executed by the processor 302, cause the processor 302 to perform the operations described herein. The memory 304 may include maps, look-up tables, functional relationships, or the like, that allow the processor 302 to set, monitor, and/or adjust the fuel injection window, the reload windows, and/or the fuel metering window.

The combustion signal generator 306 may generate the combustion signal 310 which causes the control valve solenoid 218 to actuate the control valve member 216, via the control valve armature 220, to the injection position. The fuel injection may include the injection of primary fuel and/or pilot fuel by the fuel injector 114 into the cylinder 104. The combustion signal 310 may have a combustion waveform. For example, the combustion waveform may represent an amplitude of the combustion signal 310 versus time. The combustion waveform may have a combustion pull-in section, a combustion keep-in section, and/or a combustion hold-in section. The combustion pull-in section may have a current level that causes the control valve member 216 to start moving and reach the fully-actuated position. The combustion keep-in section may have a current level that is less than the combustion pull-in section and that prevents return of the control valve member 216. The combustion keep-in section may have a minimum or reduced current to minimize delay between when current drops to zero and when the control valve member 216 actually reaches the resting position. Although the combustion waveform is described herein as including particular sections and a particular number of sections, it should be understood that other embodiments may include combustion waveforms including any particular sections and any number of sections (e.g., a single section, two sections, three sections, four sections, etc.). In configurations with four sections, the sections may include a pull-in section, a keep-in section, a hold-in section, and a battery-power section. The battery-power section may have an amplitude that is similar to that of the hold-in section.

The metering signal generator 308 may generate the metering signal 312 which causes the control valve solenoid 218 to actuate the control valve member 216, via the control valve armature 220, to the metering position. The fuel metering may include the introduction of the pilot fuel from the low-pressure fuel passage 244 into the nozzle 234 via the injection valve fill passage 230 while the fuel injector 114 is not injecting fuel into the cylinder 104. The metering signal 312 may have a metering waveform. For example, the metering waveform may represent an amplitude of the metering signal versus time. The metering waveform may have a metering pull-in section, a metering keep-in section, and/or a metering hold-in section. The metering pull-in section may have a current level that causes the control valve member 216 to start moving and reach the fully-actuated position. The metering keep-in section may have a current level that is less than the metering pull-in section and that prevents return of the control valve member 216. The metering keep-in section may have a minimum or reduced current to minimize delay between when current drops to zero and when the control valve member 216 actually reaches the resting position. Although the metering waveform is described herein as including particular sections and a particular number of sections, it should be understood that other embodiments may include metering waveforms including any particular sections and any number of sections (e.g., a single section, two sections, three sections, four sections, etc.).

The ECM 126 may be configured to generate the combustion signal and/or the metering signal based on predetermined information. Additionally, or alternatively, the ECM 126 may be configured to generate the combustion signal and/or the metering signal based on engine sensor data received from the engine sensor 108, crankshaft sensor data received from the crankshaft sensor 112, and/or sensor data received from the sensor 124.

The ECM 126 may be configured to set or adjust the fuel injection window, the reload windows, and/or the fuel metering window based on predetermined information. Additionally, or alternatively, the ECM 126 may be configured to set or adjust the fuel injection window, the reload windows, and/or the fuel metering window based on engine sensor data received from the engine sensor 108, crankshaft sensor data received from the crankshaft sensor 112, and/or sensor data received from the sensor 124.

INDUSTRIAL APPLICABILITY

Figure 4:
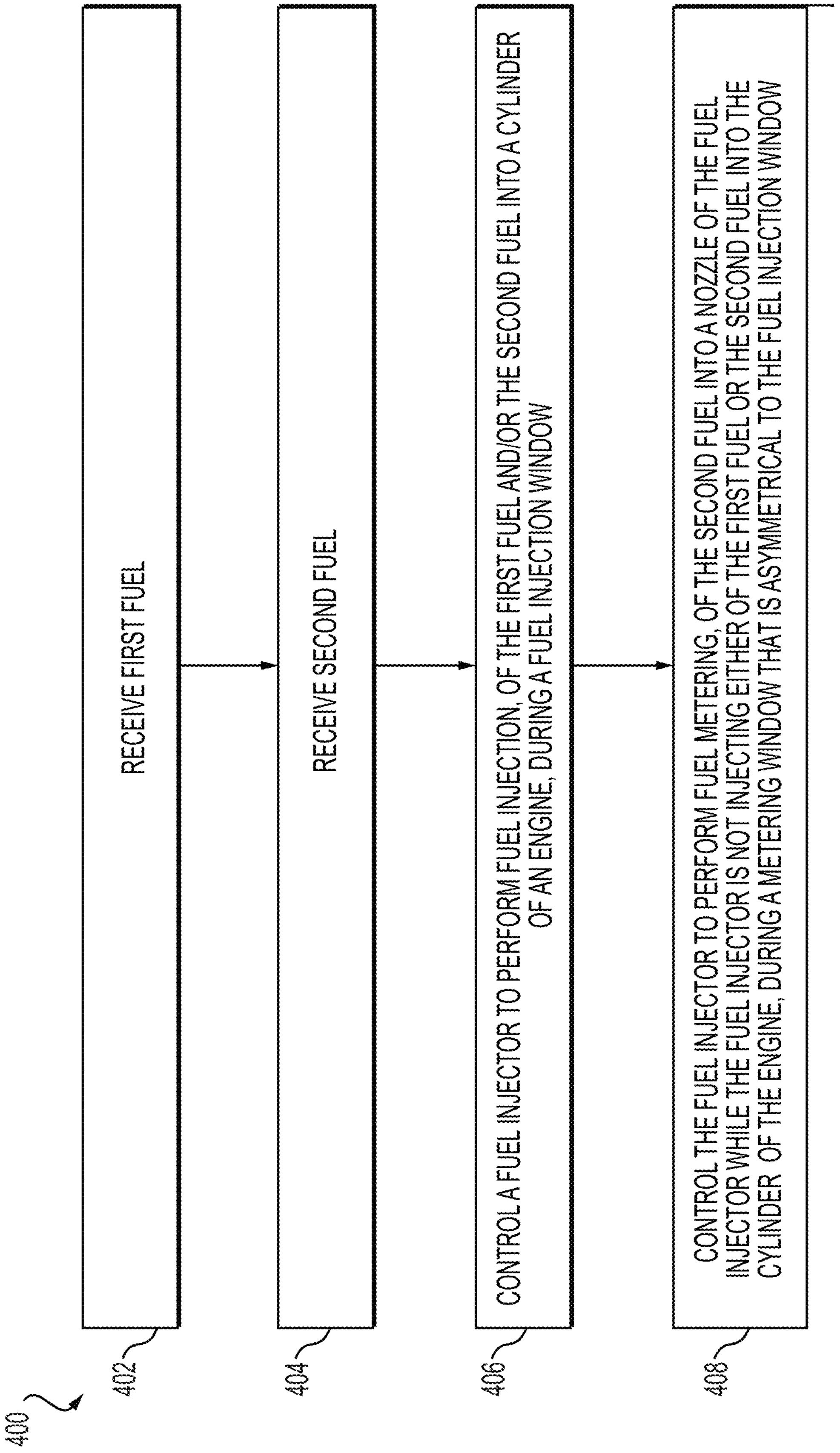
FIG. 4 is a diagram of an example process for controlling a fuel injector to perform fuel injection during a fuel injection window and to perform fuel metering during a fuel metering window that is asymmetric to the fuel injection window.

FIG. 4 is a diagram of an example process for controlling a fuel injector to perform fuel injection during a fuel injection window and to perform fuel metering during a fuel metering window that is asymmetric to the fuel injection window.

As shown in FIG. 4, the process 400 may include receiving first fuel (operation 402). For example, the multi-fuel injection system 100 may receive first fuel. The first fuel may be primary fuel. The primary fuel may be a fuel with a low cetane rating. For example, the cetane rating of the primary fuel may be less than a threshold (e.g., 20, 10, etc.). As a particular example, the primary fuel may be methanol. As described above, the primary fuel may be received with the fuel injector 114 via the primary fuel pump 118 and the primary fuel reservoir 116.

As further shown in FIG. 4, the process 400 may include receiving second fuel (operation 404). For example, the multi-fuel injection system 100 may receive second fuel. The second fuel may be pilot fuel. The pilot fuel may be a fuel with a higher cetane rating than the primary fuel. For example, the cetane rating of the pilot fuel may be greater than a threshold (e.g., 20, 10, etc.). As a particular example, the pilot fuel may be diesel. As described above, the pilot fuel may be received with the fuel injector 114 via the pilot fuel pump 122 and the pilot fuel reservoir 120.

As further shown in FIG. 4, the process 400 may include controlling a fuel injector to perform fuel injection, of the first fuel and/or the second fuel into a cylinder of an engine, during a fuel injection window (operation 406). For example, the ECM 126 may generate a combustion signal 310 having a combustion waveform which causes the fuel injector 114 to perform fuel injection to inject the first fuel and/or the second fuel into the cylinder 104 of the engine 102 by the fuel injector 114 during a fuel injection window. As a particular example, the ECM 126 may generate the combustion signal 310 which causes the control valve solenoid 218 to actuate the control valve member 216 to the injection position. The fuel injection may include the injection of the first fuel (e.g., primary fuel) and/or the second fuel (e.g., pilot fuel) by the fuel injector 114 into the cylinder 104 during a fuel injection window.

The combustion signal 310 may have a combustion waveform. For example, the combustion waveform may represent an amplitude of the combustion signal versus time. The combustion waveform may have a combustion pull-in section, a combustion keep-in section, and/or a combustion hold-in section.

Figure 5:
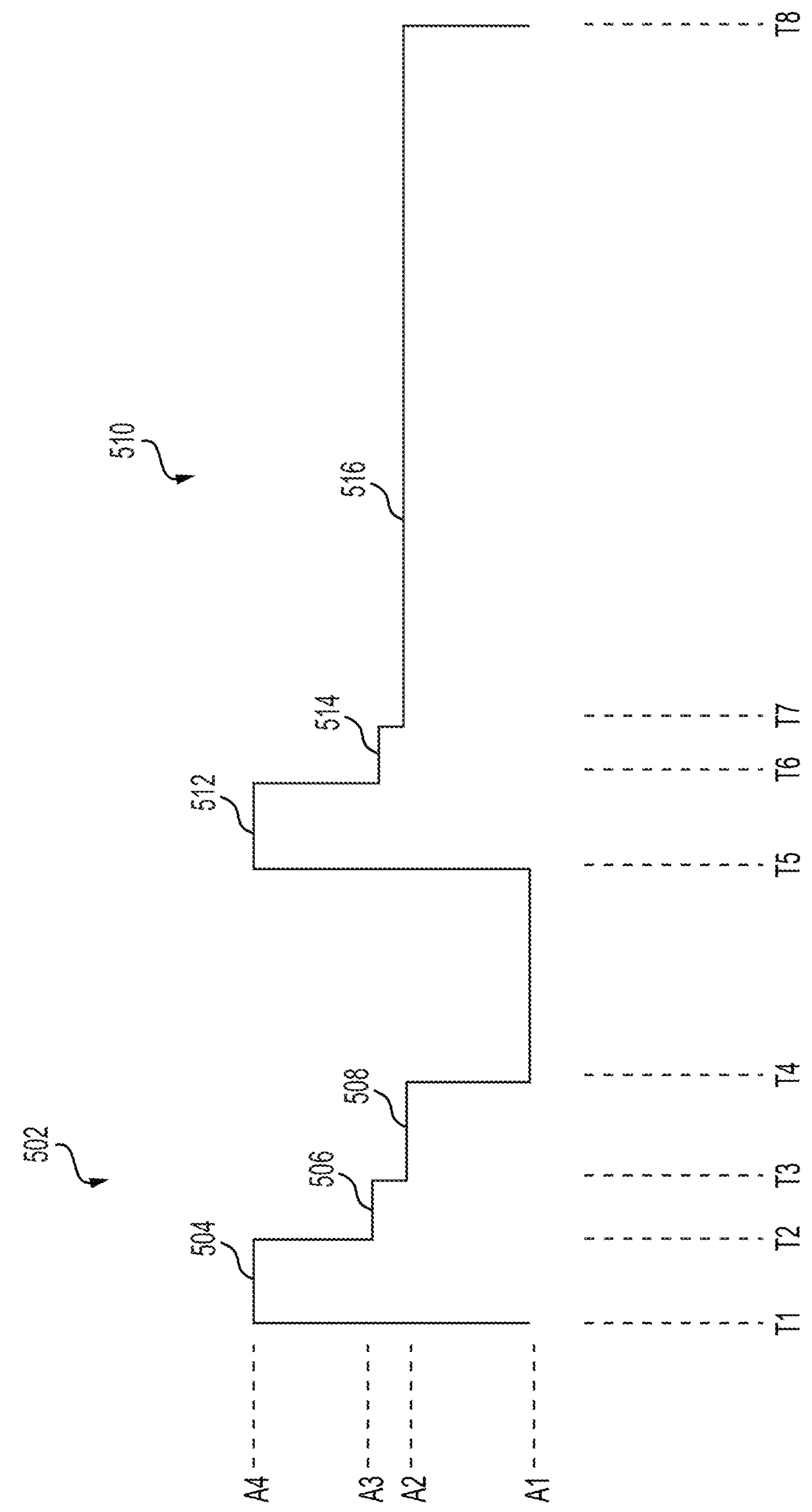
FIG. 5 is a diagram of an example combustion waveform and a metering waveform.

As an example, and as shown in FIG. 5, the ECM 126 may generate a combustion signal 310 having a combustion waveform 502. The combustion waveform 502 may include a combustion pull-in section 504 that has a duration that extends from a time T1 to a time T2 and that includes an amplitude A4, a combustion keep-in section 506 that has a duration that extends from a time T2 to a time T3 and that includes an amplitude A3, and a combustion hold-in section 508 that has a duration that extends from a time T3 to a time T4 and that includes an amplitude A2. The illustrated amplitudes may represent the average current or target current for each section. The current (e.g., pull-in, keep-in, and/or hold-in sections) may be a chopped waveform, in which the current regularly repeats between a maximum value and a minimum value that are slightly greater than and slightly less than the average value, respectively.

As further shown in FIG. 4, the process 400 may include controlling the fuel injector 114 to perform fuel metering, of the second fuel into a nozzle 234 of the fuel injector 114 while the fuel injector 114 is not injecting either of the first fuel or the second fuel into the cylinder of the engine, during a fuel metering window that is asymmetric to the fuel injection window (operation 408). For example, the ECM 126 may generate a metering signal 312 having a metering waveform to cause the fuel injector 114 to perform fuel metering to introduce the second fuel into the nozzle 234 of the fuel injector 114 while the fuel injector 114 is not injecting the first fuel or the second fuel into the cylinder 104 of the engine 102 during a fuel metering window. As a particular example, the ECM 126 may generate the metering signal 312 to cause the control valve solenoid 218 to actuate the control valve member 216, via the control valve armature 220, to the metering position. The fuel metering may include the introduction of the pilot fuel from the low-pressure fuel passage 244 into the nozzle 234 via the injection valve fill passage 230 while the fuel injector 114 is not injecting the first fuel or the second fuel into the cylinder 104.

The metering signal 312 may have a metering waveform. For example, the metering waveform may represent an amplitude of the metering signal 312 versus time. The metering waveform may have a metering pull-in section, a metering keep-in section, and/or a metering hold-in section. The metering waveform may have a metering hold-in section that includes a duration that is greater than a duration of a combustion hold-in section of the combustion waveform.

As shown in FIG. 5, the ECM 126 may generate a metering signal having a metering waveform 510. The metering waveform 510 may include a metering pull-in section 512 that has a duration that extends from a time T5 to a time T6 and that includes an amplitude A4, a metering keep-in section 514 that has a duration that extends from a time T6 to a time T7 and that includes an amplitude A3, and a metering hold-in section 516 that has a duration that extends from a time T7 to a time T8 and that includes an amplitude A2.

The fuel metering window may be asymmetric to the fuel injection window. For example, the fuel injection window may be delineated by a first crank angle of the crankshaft 110 and a second crank angle of the crankshaft 110, the fuel metering window may be delineated by a third crank angle of the crankshaft 110 and a fourth crank angle of the crankshaft 110, and a first rotational distance between the first crank angle and the second crank angle is less than a second rotational distance between the third crank angle and the fourth crank angle. The first rotational distance may be less than a threshold number of degrees (e.g., 100°, 120°, 160°, or the like) of rotation of the crankshaft 110, and the second rotational distance may be greater than the threshold number of degrees of rotation of the crankshaft 110. As another example, the fuel metering window may be n (e.g., one, two, three, etc.) times greater than the fuel injection window.

As another example, the fuel injection window may be delineated by a first time and a second time, the fuel metering window may be delineated by a third time and a fourth time, and a first duration between the first time and the second time may be less than a second duration between the third time and the fourth time. As another example, the fuel injection window may be delineated, at least partially by, a combustion hold-in section that includes a particular duration, and the fuel metering window may be delineated, at least partially by, a metering hold-in section that includes a duration that is greater than a duration of the combustion hold-in section. As another example, the fuel injection window may encompass a portion of one or more strokes of the combustion cycle of the engine 102, and the fuel metering window may encompass a greater portion of the one or more strokes of the combustion cycle of the engine 102.

Figure 6:
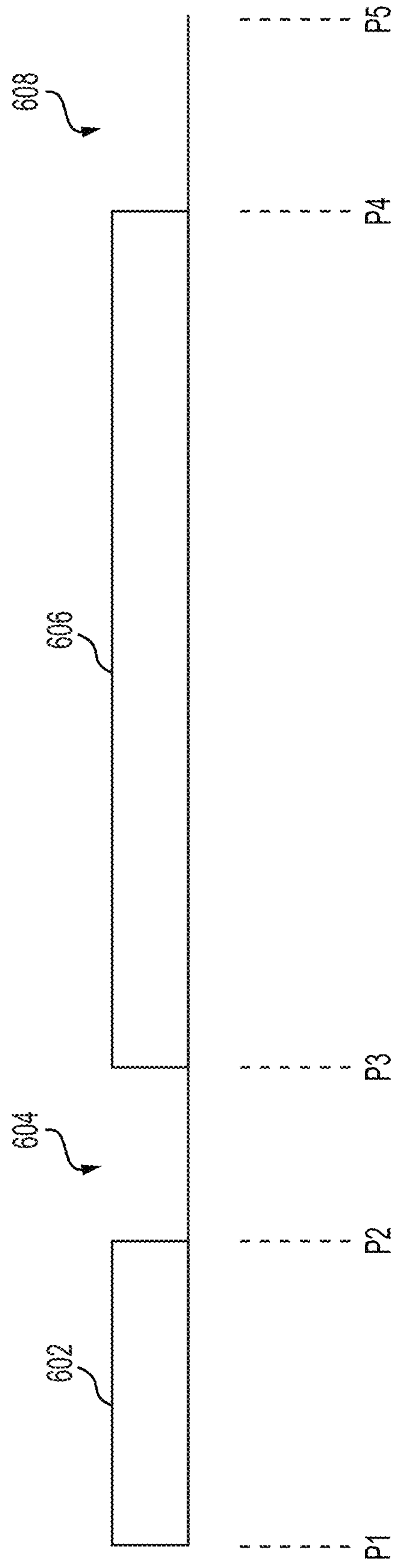
FIG. 6 is a diagram of a fuel injection window and a fuel metering window that is asymmetric to the fuel injection window.

As shown in FIG. 6, the ECM 126 may control the fuel injector 114 to perform fuel injection during a fuel injection window 602, may refrain from controlling the fuel injector 114 to perform either of fuel injection or fuel metering during a reload window 604, may control the fuel injector 114 to perform fuel metering during a fuel metering window 606, and may refrain from controlling the fuel injector 114 to perform either of fuel injection or fuel metering during a reload window 608. The reload window 604 and/or the reload window 608 may be windows in which fuel injection and fuel metering are prohibited.

The fuel injection window 602 may be delineated by a first crank angle P1 and a second crank angle P2. As examples, the first crank angle P1 may be 70° before top dead center (BTDC), and the second crank angle P2 may be 70° after top dead center (ATDC). The reload window 604 may be delineated by the second crank angle P2 and a third crank angle P3. As examples, the second crank angle P2 may be 70° ATDC, and the third crank angle P3 may be 70° ATDC to 90° ATDC. The fuel metering window 606 may be delineated by the third crank angle P3 and a fourth crank angle P4. As examples, the third crank angle P3 may be 90° ATDC, and the fourth crank angle may be 630° ATDC. The reload window 608 may be delineated by the fourth crank angle P4 and a fifth crank angle P5. As examples, the fourth crank angle P4 may be 630° ATDC, and the fifth crank angle P5 may be 640° ATDC.

It should be understood that the above crank angles are examples only, and that the ECM 126 may be configured to control the fuel injector 114 during fuel injection windows and fuel metering windows having different delineations of crank angles. The ECM 126 may be configured to set the fuel injection window 602 and the fuel metering window 606, based on engine sensor data received from the engine sensor 108, based on crankshaft sensor data received from the crankshaft sensor 112, and/or based on sensor data received from the sensor 124. For example, the ECM 126 may select, or modify, the respective durations and/or sizes of the respective windows.

The disclosed aspects of the system and method for controlling a fuel injector to perform fuel injection using a fuel injection window and to perform fuel metering using a fuel metering window that is asymmetric to the fuel injection window may be used in conjunction with any appropriate machine, vehicle, or other device or system that includes an engine having a fuel injector that is configured to perform fuel injection and fuel metering. In particular the system and method may be used in any heavy equipment, marine power system, oil and gas system, industrial power system, or the like, in which an ECM may control a fuel injector to perform fuel injection using a fuel injection window and to perform fuel metering using a fuel metering window that is asymmetric to the fuel injection window. The disclosed aspects may provide ample duration for fuel metering and allow a timing range of the fuel metering to encompass at least some of the remaining three strokes of the engine, which allows for optimization of the metered quantity of the pilot fuel, and also the time for mixing the pilot fuel and the primary fuel before the fuel injection window starts. Further, the disclosed aspects may reduce heat during fuel metering by permitting ample duration and thus permitting lower current amplitude, may reduce power consumption, may allow changes in an amount of pilot duel due to different possible durations of fuel metering, or the like.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method comprising:

receiving, by a multi-fuel injection system, a first liquid fuel;

receiving, by the multi-fuel injection system, a second liquid fuel;

controlling, by the multi-fuel injection system, a fuel injector to perform fuel injection of the first liquid fuel and the second liquid fuel into a cylinder of an engine via a nozzle, during a fuel injection window; and controlling, by the multi-fuel injection system, the fuel injector to perform fuel metering, of the second liquid fuel into the nozzle of the fuel injector while the fuel injector is not injecting either of the first liquid fuel or the second liquid fuel into the cylinder of the engine, during a fuel metering window that is asymmetric to the fuel injection window.

2. The method of claim 1, further comprising:

controlling the fuel injector, to refrain from the fuel injection or the fuel metering, during a reload window between the fuel injection window and the fuel metering window in which the fuel injection and the fuel metering are prohibited.

3. A method comprising:

receiving, by a multi-fuel injection system, a first fuel;

receiving, by the multi-fuel injection system, a second fuel;

controlling, by the multi-fuel injection system, a fuel injector to perform fuel injection, of at least one of the first fuel or the second fuel into a cylinder of an engine, during a fuel injection window; and controlling, by the multi-fuel injection system, the fuel injector to perform fuel metering, of the second fuel into a nozzle of the fuel injector while the fuel injector is not injecting either of the first fuel or the second fuel into the cylinder of the engine, during a fuel metering window that is asymmetric to the fuel injection window, wherein:

the fuel injection window is delineated by a first crank angle of a crankshaft and a second crank angle of the crankshaft, the fuel metering window is delineated by a third crank angle of the crankshaft and a fourth crank angle of the crankshaft, and a first rotational distance between the first crank angle and the second crank angle is less than a second rotational distance between the third crank angle and the fourth crank angle, or the fuel injection window is delineated by a first time and a second time, the fuel metering window is delineated by a third time and a fourth time, and a first duration between the first time and the second time is less than a second duration between the third time and the fourth time.

4. The method of claim 3, wherein:

the fuel injection window is delineated by the first time and the second time, the fuel metering window is delineated by the third time and the fourth time, and the first duration between the first time and the second time is less than the second duration between the third time and the fourth time.

5. The method of claim 1, further comprising:

generating a combustion signal including a combustion waveform including a combustion hold-in section; and generating a metering signal including a metering waveform including a metering hold-in section that includes a duration that is greater than a duration of the combustion hold-in section.

6. The method of claim 1, wherein the first liquid fuel is a primary fuel and the second liquid fuel is a pilot fuel.

7. The method of claim 6, wherein the first liquid fuel has a lower cetane rating than the second liquid fuel.

8. An electronic control module (ECM) comprising:

a memory configured to store instructions; and one or more processors configured to execute the instructions to:

control a fuel injector to perform fuel injection, of at least one of first fuel or a second fuel into a cylinder of an engine, during a fuel injection window; and control the fuel injector to perform fuel metering, the fuel metering including actuating a valve of the fuel injector to introduce the second fuel into a nozzle of the fuel injector while the fuel injector is not injecting either of the first fuel or the second fuel into the cylinder of the engine, during a fuel metering window that is greater than the fuel injection window.

9. The ECM of claim 8, wherein the one or more processors are further configured to:

control the fuel injector, to refrain from the fuel injection or the fuel metering, during a reload window between the fuel injection window and the fuel metering window.

10. The ECM of claim 8, wherein:

the fuel injection window is delineated by a first crank angle of a crankshaft and a second crank angle of the crankshaft, the fuel metering window is delineated by a third crank angle of the crankshaft and a fourth crank angle of the crankshaft, and a first rotational distance between the first crank angle and the second crank angle is less than a second rotational distance between the third crank angle and the fourth crank angle.

11. The ECM of claim 8, wherein:

the fuel injection window is delineated by a first time and a second time, the fuel metering window is delineated by a third time and a fourth time, and a first duration between the first time and the second time is less than a second duration between the third time and the fourth time.

12. The ECM of claim 8, wherein the one or more processors are further configured to:

generate a combustion signal including a combustion waveform including a combustion hold-in section; and generate a metering signal including a metering waveform including a metering hold-in section that includes a duration that is greater than a duration of the combustion hold-in section.

13. The ECM of claim 8, wherein the ECM is configured to adjust the fuel metering window based on engine sensor data received from an engine sensor, crankshaft sensor data received from a crankshaft sensor, or sensor data received from a sensor.

14. The ECM of claim 8, wherein the fuel metering window is at least twice as long as the fuel injection window.

15. A system comprising:

a fuel injector configured to perform fuel injection and fuel metering; and an electronic control module (ECM) configured to:

control the fuel injector to perform the fuel injection, of at least one of a first fuel or a second fuel into a cylinder of an engine, during a fuel injection window; and control the fuel injector to perform the fuel metering, the fuel metering including actuating a valve of the fuel injector to introduce the second fuel into a nozzle of the fuel injector while the fuel injector is not injecting either of the first fuel or the second fuel into the cylinder of the engine, during a fuel metering window that is asymmetric to the fuel injection window, wherein:

the fuel injection window is delineated by a first time and a second time, the fuel metering window is delineated by a third time and a fourth time, and a first duration between the first time and the second time is less than a second duration between the third time and the fourth time.

16. The system of claim 15, wherein the ECM is further configured to:

control the fuel injector, to refrain from the fuel injection or the fuel metering, during a reload window between the fuel injection window and the fuel metering window.

17. The system of claim 15, wherein:

the fuel injection window is delineated by a first crank angle of a crankshaft and a second crank angle of the crankshaft, the fuel metering window is delineated by a third crank angle of the crankshaft and a fourth crank angle of the crankshaft, and a first rotational distance between the first crank angle and the second crank angle is less than a second rotational distance between the third crank angle and the fourth crank angle.

18. The system of claim 15, wherein the ECM is further configured to:

generate a combustion signal including a combustion waveform including a combustion hold-in section; and generate a metering signal including a metering waveform including a metering hold-in section that includes a duration that is greater than a duration of the combustion hold-in section.

19. The system of claim 15, wherein the first fuel is a primary fuel and the second fuel is a pilot fuel.

* * * * *